United States Patent
Nordback

(10) Patent No.: US 11,003,258 B2
(45) Date of Patent: May 11, 2021

(54) PROJECTOR WITH INTEGRATED LASER POINTER

(71) Applicant: Konica Minolta Laboratory U.S.A., Inc., San Mateo, CA (US)

(72) Inventor: Kurt Nathan Nordback, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 235 days.

(21) Appl. No.: 16/370,520

(22) Filed: Mar. 29, 2019

(65) Prior Publication Data

US 2020/0310559 A1    Oct. 1, 2020

(51) Int. Cl.
*G06F 3/03*    (2006.01)
*G03B 21/20*    (2006.01)
*G06F 3/0354*    (2013.01)

(52) U.S. Cl.
CPC ....... *G06F 3/03542* (2013.01); *G03B 21/206* (2013.01); *G03B 21/2033* (2013.01)

(58) Field of Classification Search
None
See application file for complete search history.

(56) References Cited

U.S. PATENT DOCUMENTS

2007/0030460 A1* 2/2007 Mehrl .................... G03B 17/54
353/79

FOREIGN PATENT DOCUMENTS

| CN | 205003427 U | 1/2016 |
| JP | 2011-128578 A | 6/2011 |
| WO | 2013/148770 A1 | 10/2013 |

\* cited by examiner

*Primary Examiner* — Michelle M Iacoletti
*Assistant Examiner* — Danell L Owens
(74) *Attorney, Agent, or Firm* — Osha Bergman Watanabe & Burton LLP

(57) ABSTRACT

A method for controlling an integrated laser pointer of a projector includes causing the integrated laser pointer to, in response to commands from a processor: switch the integrated laser pointer to an ON state and adjust a position of the integrated laser pointer to display a dot on a predetermined position of a projected image, switch between the ON state and an OFF state in synchronization with a change in a content of the projected image, switch between an automatic mode and a manual mode, and switch to the OFF state and stop displaying the dot.

20 Claims, 5 Drawing Sheets

US 11,003,258 B2

PROJECTOR WITH INTEGRATED LASER POINTER

BACKGROUND

Laser pointers enable users to direct and focus an audience's attention to specific content or information. However, when operating laser pointers by hand, user-based errors such as fluctuations in the laser dot caused by natural hand tremors are unavoidable. These fluctuations may be distracting for the audience and embarrassing for the users. Regardless, users still wish to be able to use laser pointers while not having to worry about the effects associated with user-caused errors.

SUMMARY

In general, in one aspect, the invention relates to a method for controlling an integrated laser pointer of a projector. The method comprises causing the integrated laser pointer to, in response to commands from a processor: switch the integrated laser pointer to an ON state and adjust a position of the integrated laser pointer to display a dot on a predetermined position of a projected image; switch between the ON state and an OFF state in synchronization with a change in a content of the projected image; switch between an automatic mode and a manual mode; and switch to the OFF state and stop displaying the dot.

In general, in one aspect, the invention relates to a non-transitory computer readable medium (CRM) storing computer readable program code for controlling an integrated laser pointer of a projector embodied therein, the computer readable program code causes the integrated laser pointer to: switch the integrated laser pointer to an ON state and adjust a position of the integrated laser pointer to display a dot on a predetermined position of a projected image; switch between the ON state and an OFF state in synchronization with a change in a content of the projected image; switch between an automatic mode and a manual mode; and switch to the OFF state and stop displaying the dot.

In general, in one aspect, the invention relates to a system for controlling an integrated laser pointer of a projector. the system comprising: the projector; the integrated laser pointer; and a processor coupled to a memory. The processor causes the integrated laser pointer to, in response to commands from the processor: switch the integrated laser pointer to an ON state and adjust a position of the integrated laser pointer to display a dot on a predetermined position of a projected image; switch between the ON state and an OFF state in synchronization with a change in a content of the projected image; switch between an automatic mode and a manual mode; and switch to the OFF state and stop displaying the dot.

Other aspects of the invention will be apparent from the following description and the appended claims.

DETAILED DESCRIPTION

Figure 1:
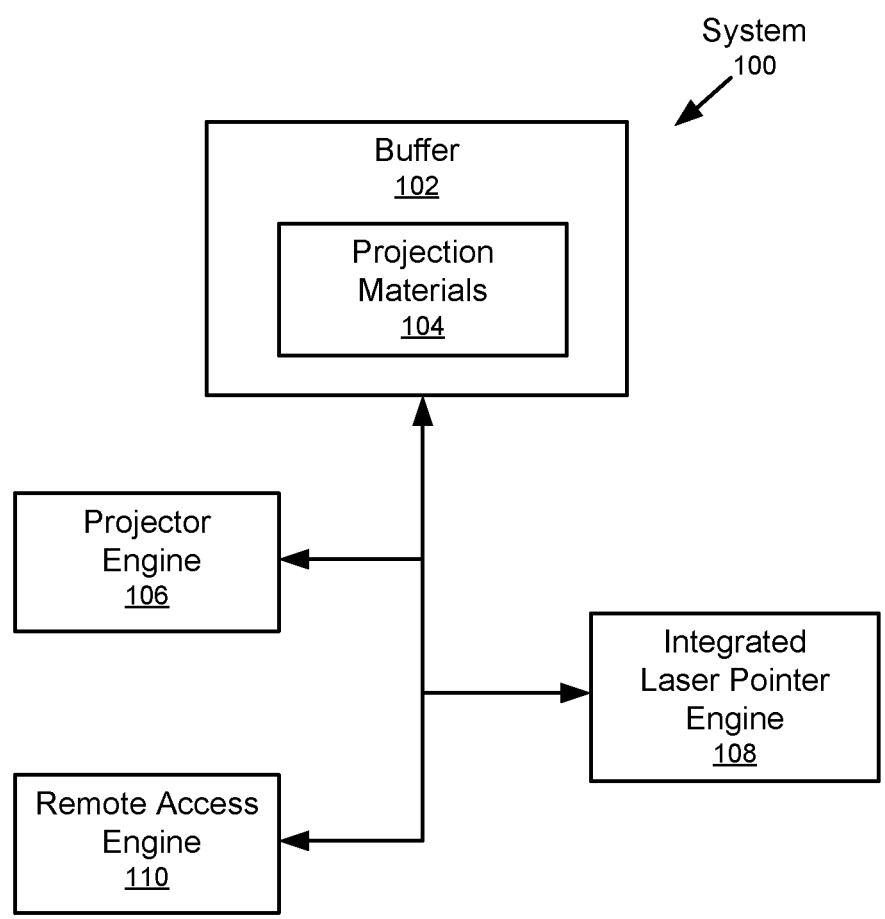
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for controlling an integrated laser pointer of a projector. The integrated laser pointer is directly assimilated with the system of the projector and controlled by a combination of mechanical components (e.g., AC/DC electric motors, actuators, piezoelectric motors, etc.). A processor, of the projector or a computer directly or indirectly connected to the projector, issues one or more commands that control the integrated laser pointer to reproduce actions performable by a user with a handheld laser pointer. With the elimination of the user having to hold the laser pointer (i.e., with the elimination of user-caused errors associated with operating a laser pointer by hand), effective use of the integrated laser pointer can be achieved.

FIG. 1 shows a system (100) in accordance with one or more embodiments of the invention. As shown in FIG. 1, the system (100) has multiple components, including, for example, a buffer (102), a projector engine (106), an integrated laser pointer engine (108), and a remote access engine (110). Each of these components (102, 106, 108, and 110) may be located on the same computing device (e.g., personal computer (PC), laptop, tablet PC, smart phone, multifunction printer, kiosk, server, PIC device, projector, etc.) or on different computing devices connected by a network of any size having wired and/or wireless segments. Each of these components is discussed below.

The buffer (102) may be implemented in hardware (i.e., circuitry), software, or any combination thereof. The buffer (102) is configured to store a projection material (104). The projection material (104) may be any type of material (e.g., a document, an image, a presentation, etc.) that includes content to be displayed to an audience and may be presented in any form (e.g., conventional projected image, an augmented reality (AR) image, etc.). Further, the projection material (104) may be of any size and in any format (e.g., PDF, OOXML, JPEG, PPT, ODF, HTML, etc.).

The system (100) includes the projector engine (106). The projector engine (106) may be implemented in hardware (i.e., circuitry), software, or any combination thereof. The projector engine (106) extracts and processes (i.e., renders) the contents of the projection material (104) to display the contents as a projected image. The projector engine (106) further controls the properties (e.g., brightness, tone, color, size, etc.) of the projected image.

The system (100) includes the integrated laser pointer engine (108). The integrated laser pointer engine (108) may be implemented in hardware (i.e., circuitry), software, or any combination thereof. The integrated laser pointer engine (108) controls a combination of mechanical components (e.g., AC/DC electric motors, actuators, piezoelectric motors, etc.) to precisely control an integrated laser pointer of a projector to reproduce actions performable by a user with a handheld laser pointer. The actions may be performed independently in response to individual commands or as a chain of subsequent actions in response to a preset chain of commands issued by the integrated laser pointer engine (108). The integrated laser pointer engine (108) may receive the commands from a user through a single or a combination of User Interfaces (UI) (e.g., a graphical user interface (GUI), a keyboard-controlled interface, a voice-controlled interface, a touch-controlled interface, etc.). Examples of actions (i.e., commands) and the UI are discussed below with more detail in FIGS. 2 and 4A to 4B.

The integrated laser pointer engine (108) may further transform a coordinate system presented in the UI into a coordinate system used by the mechanical components controlling the physical integrated laser pointer. The coordinate system in the UI may be a Cartesian coordinate system that corresponds to coordinates of a flat surface on which the image is being projected. On the other hand, the coordinate system used by the mechanical components may be two-dimensional angular coordinates (e.g., a $\theta$, $\varphi$ of spherical coordinates), planar circular coordinates (r, $\theta$), or any type of coordinate system that could accurately and precisely control the horizontal and lateral movements of the integrated laser pointer.

The integrated laser pointer engine (108) may further switch the laser pointer between an ON state and an OFF state (i.e., power the integrated laser ON or OFF, respectively). When the integrated laser pointer is switched to the ON state for the first time, the integrated laser pointer engine (108) receives the dimensions of the projected image and calibrates the dimensions of the UI to the dimensions of the projected image. This ensures that an actual movement of the integrated laser pointer on the projected image accurately reflects a control of the integrated laser pointer input into through the UI.

The integrated laser pointer engine (108) may further switch the integrated laser pointer between a manual mode and an automatic mode in response to mode change commands. The mode change commands include a manual-control command and an automatic-control command input through the UI. For example, assume that the integrated laser pointer is operating in manual mode and the integrated laser pointer engine (108) receives an automatic-control command. The integrated laser pointer engine (108) will switch the integrated laser pointer from manual mode to automatic mode, and vice versa.

In automatic mode, the integrated laser pointer is controlled by a preset command or a preset chain of subsequent commands that initiate at specific times during the projection of the projected image or when specific content is displayed in the projected image. During automatic mode, other than switching the integrated laser pointer to manual mode, the user is unable to directly control the integrated laser pointer using any peripheral devices (e.g., a computer mouse, a keyboard, a touch pad, etc.) connected to the system (100).

In manual mode, the integrated laser pointer is directly controlled by the user using peripheral devices connected to the system (100). For example, assume that one of the peripheral devices is a computer mouse. The user may use the computer mouse to control the integrated laser pointer (i.e., the movement of the integrated laser pointer reflects a movement of the computer mouse).

The integrated laser pointer engine (108) may further adjust, in both manual mode and automatic mode, the integrated laser pointer to display a laser dot on a surface outside an area delimiting the projected image. For example, assume a user wants to point to contents on an object (e.g., a blackboard, a whiteboard, a piece of paper, etc.) that is outside of the projected image. The integrated laser pointer engine (108) may adjust and control the integrated laser pointer to point at these contents.

The projector engine (106) and the integrated laser pointer engine (108) may work in tandem to synchronize (i.e., match up) the projection of the projected image and the control of the integrated laser pointer. Furthermore, the projector engine (106) and the integrated laser pointer engine (108) may be controlled using commands issued from a single UI. Alternatively, control of the projector engine (106) and the integrated laser pointer engine (108) may be allocated to separate UIs.

The system (100) includes the remote access engine (110). The remote access engine (110) may be implemented in hardware (i.e., circuitry), software, or any combination thereof. The remote access engine (110) controls a switching of the integrated laser pointer between a local-controlled mode and a remote-controlled mode. The remote access engine (110) may switch the integrated laser pointer between the local-controlled mode and the remote-controlled mode at any time upon receipt of a remote-share command from a user.

In local-controlled mode, the integrated laser pointer is controlled by a user directly operating the system (100) or a main device (e.g., personal computer (PC), laptop, tablet PC, smart phone, kiosk, etc.) connected to and controlling the system (100). For example, assume that the system (100) is disposed in a projector and the projector is physically connected via wires and cables to a computer with a computer mouse and keyboard. A user operating the projector using the computer mouse and keyboard is operating the system (100) in the local-controlled mode.

In remote-controlled mode, the integrated laser pointer is controlled by a user indirectly operating either the system (100) or the main device connected to and controlling the system (100) (i.e., through a remote connection via the internet). For example, assume that the system (100) is disposed in a projector and the projector is physically connected via wires and cables to a computer with an internet connection. Further assume that a user with a laptop connects to the computer using an internet connection and is given access to control the computer. The user with the laptop is operating the integrated laser pointer in the remote-controlled mode.

In the remote-controlled mode, the commands for controlling the integrated laser pointer may be received as remote access commands. For example, assume the above situation of the user with the laptop. The commands sent from the laptop to control the computer are the remote access commands. Alternatively, in the remote-controlled mode, the commands for controlling the integrated laser pointer may be received as trajectory information. The trajectory information includes movements of a laser pointer held by the user (i.e., a remote laser pointer). For example, assume the above situation of the user with the laptop. The user is physically holding a laser pointer and pointing to contents displayed on a screen of the laptop. The movement of the handheld laser pointer on the laptop screen is tracked (e.g., using motion tracking, camera tracking, etc., of the movement of the user or the laser dot on laptop screen) and converted to the trajectory information.

Although the system (100) is shown as having four components (102, 106, 108, 110), in other embodiments of the invention, the system (100) may have more or fewer components. Further, the functionality of each component described above may be split across components or combined in a single component. Further still, each component (102, 106, 108, 110) may be utilized multiple times to carry out an iterative operation.

Figure 2:
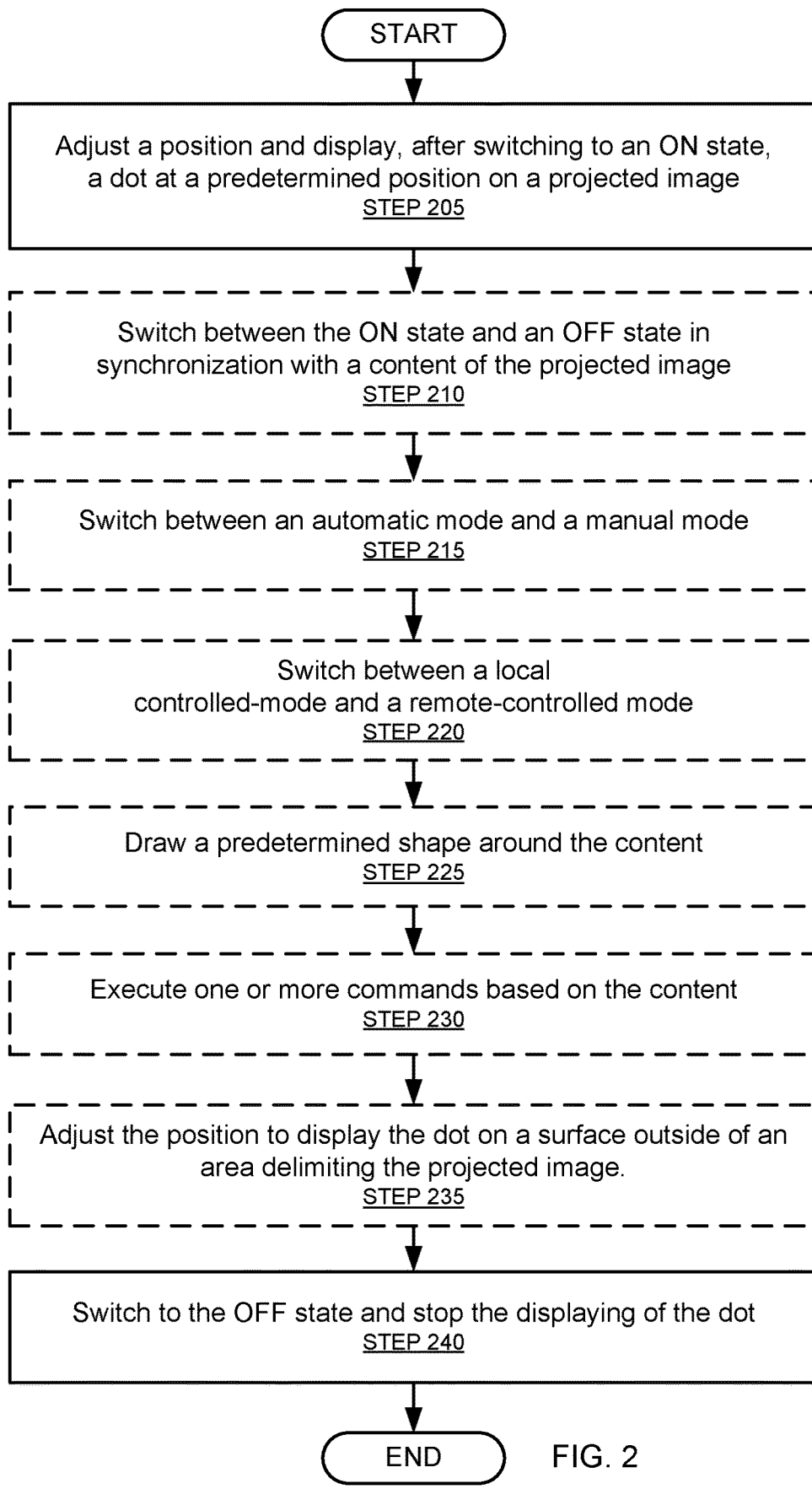
FIG. 2 shows a flowchart in accordance with one or more embodiments of the invention.

FIG. 2 shows a flowchart in accordance with one or more embodiments of a process for controlling an integrated laser pointer of a projector. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order from the order shown in FIG. 2. Accordingly, the scope of the invention should not be considered limited to the specific arrangement of steps shown in FIG. 2.

Initially, in STEP 205, as discussed above in FIG. 1, a position of the integrated laser pointer is adjusted and the integrated laser pointer is switched to an ON state to display a laser dot (herein referred to as "a dot") at a predetermined position on an image projected by a projector (i.e., a projected image). The adjustment of the position is based on the calibration of the integrated laser pointer as discussed above in FIG. 1. The predetermined position may be a default start position set in the system or a position set by a user through a UI.

In STEP 210, the integrated laser pointer may be switched between the ON state and the OFF state in synchronization with a change in the contents of the projected image. More specifically, certain contents in the projected image need not be highlighted by the integrated laser pointer. When these contents appear in the projected image, the integrated laser pointer is switched to the OFF state (i.e., powered off) to avoid the dot becoming a distraction to the audience.

In STEP 215, as discussed above in FIG. 1, the integrated laser pointer may be switched between an automatic mode and a manual mode. When the integrated laser pointer is switched back to the automatic mode after being switched to the manual mode, the integrated laser pointer may continue to execute a preset chain of commands where the preset chain of commands was left off before the switch to manual mode (i.e., continue the last command before the switch). Alternatively, the integrated laser pointer may execute a new set of commands.

In STEP 220, as discussed above in FIG. 1, the integrated laser pointer may be switched between a local-controlled mode and a manual-controlled mode. The switch between the local-controlled mode and the manual-controlled mode may be executed based on factors (i.e., location, access to the integrated laser pointer, etc.) associated with the user or users presenting the projected image.

In STEP 225, the integrated laser pointer may draw a predetermined shape (e.g., a circle, an oval, a square, one or more combination of lines, an arrow, etc.) around or in proximity of a specific content of the projected image. The drawing of the predetermined shaped is an action by the integrated laser pointer that may be received as an individual command or part of a preset chain of commands from the UI, as discussed above in FIG. 1.

In STEP 230, as discussed above in FIG. 1, the integrated laser pointer may be triggered to execute one or more commands (i.e., a single command or a preset chain of commands) when certain contents being displayed. The commands may be embedded, through the UI, in the contents of the projected image. This is described in more detail below in FIGS. 4A and 4B.

In STEP 235, as discussed above in FIG. 1, the position of the integrated laser pointer may be adjusted to point to contents on an object (e.g., a blackboard, a whiteboard, a piece of paper, etc.) that is outside of the projected image.

In STEP 240, the integrated laser pointer is switched to an OFF state and the displaying of the dot is stopped. This step may be executed at the end of a presentation based on the projected image or at any time during the presentation when the use of the integrated laser pointer is not.

Figure 3:
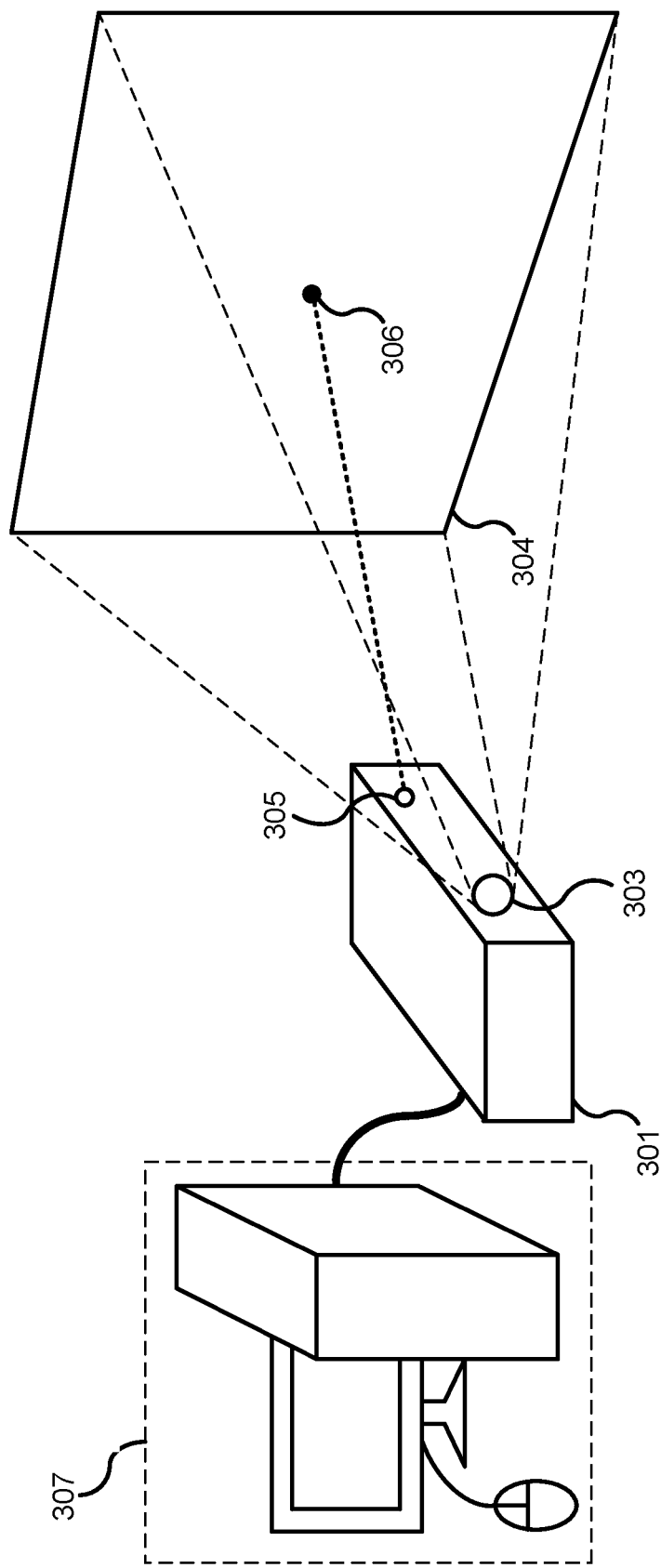
FIG. 3 shows an implementation example in accordance with one or more embodiments of the invention.

FIG. 3 shows an implementation example according to one or more embodiments. Specifically, FIG. 3 shows a projector (301) that includes a standard output (303) that projects an image (304) and an integrated laser pointer (305) that projects a laser dot (306) on the image (304). The laser dot (306) is brighter than the image (304), resulting in a clear perception of laser dot (306) on the image (304). The projector (301) is coupled to a computer (307) that may control the functions of the projector (301). Further, the projector (301) or the combination of the projector (301) and the computer (307) may be controlled using the system (100) as discussed above in reference to FIG. 1. Alternatively, the computer (307) may not be required.

Figure 4A:
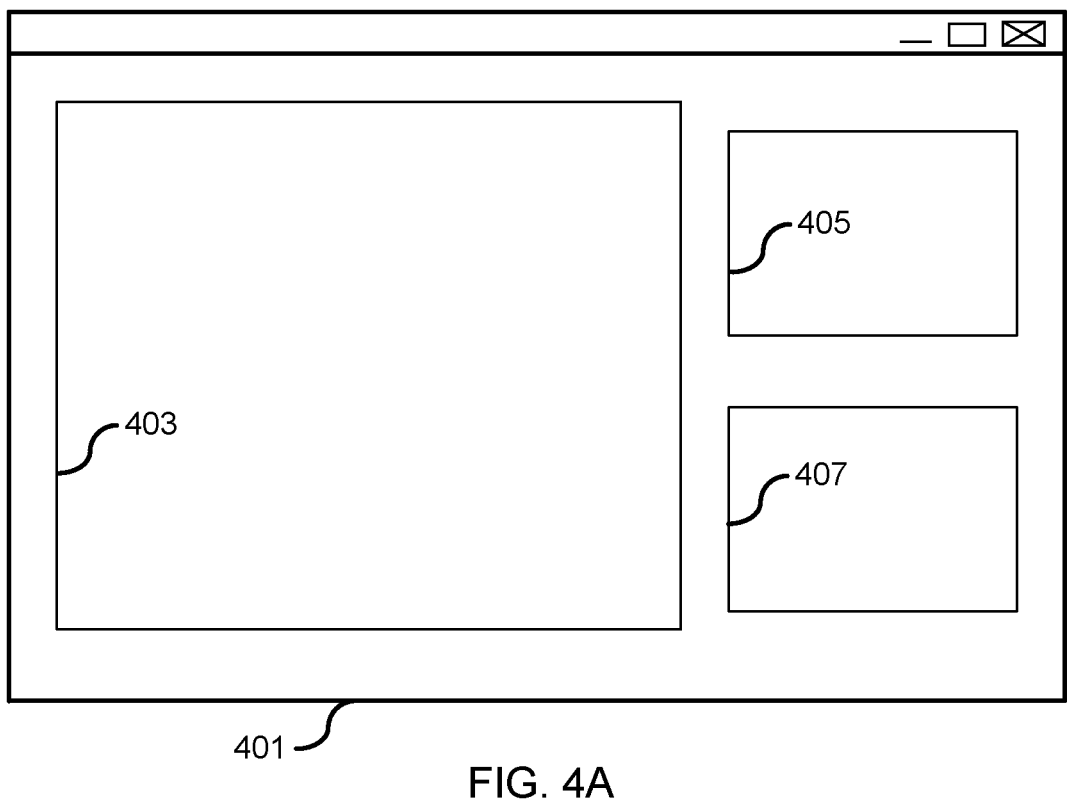
FIGS. 4A to 4B show an implementation example in accordance with one or more embodiments of the invention.
Figure 4B:
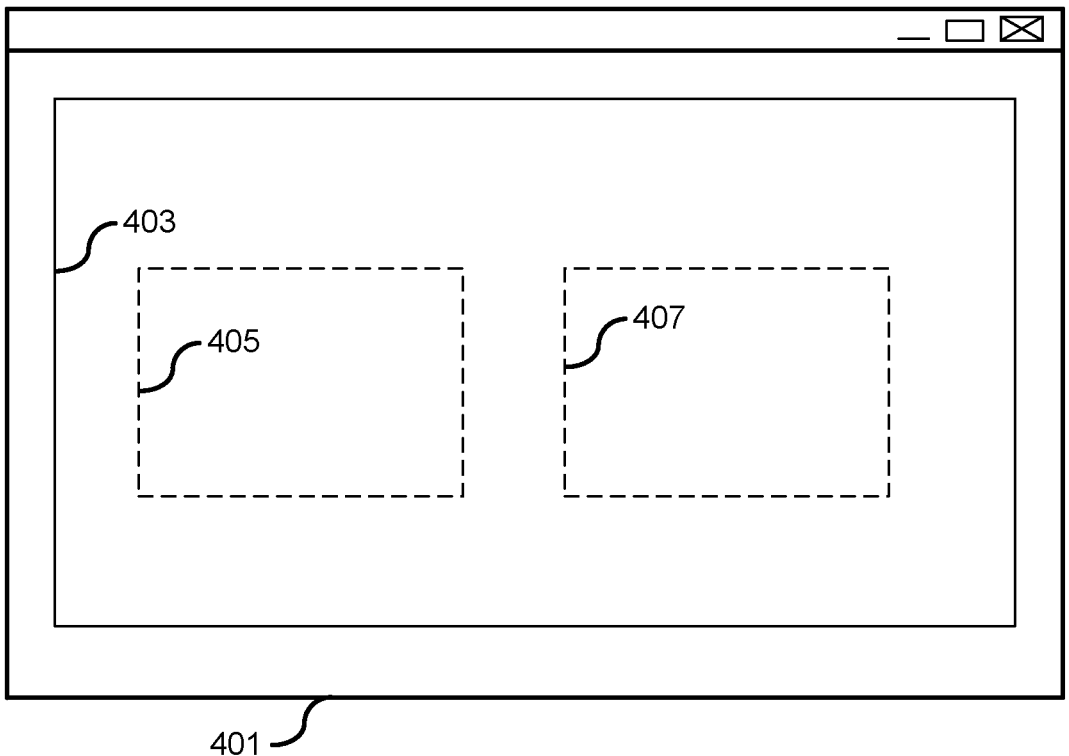
Figure 5:
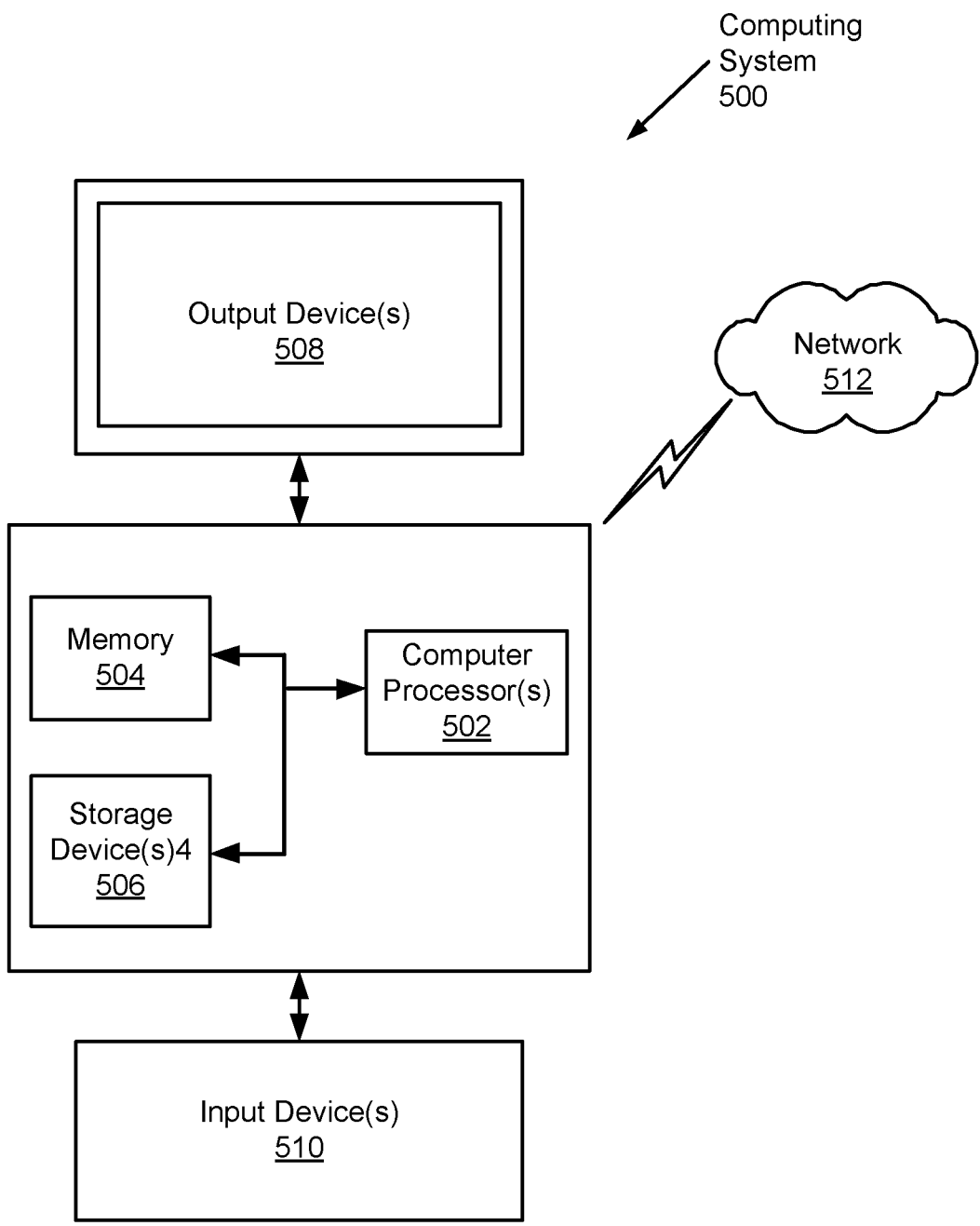
FIG. 5 shows a computing system in accordance with one or more embodiments of the invention.

FIGS. 4A to 4B show an implementation example according with one or more embodiments. Specifically, FIG. 4A shows a user interface (UI) (401) that includes an area displaying the projection material (403), an area displaying projector display commands (405), and an area displaying integrated laser pointer commands (407). The UI (401) is shown as a graphical user interface (GUI). A user with access to the UI (401) may control projection of the projection material (403) (e.g., start/stop projection, change density of projected image, change brightness of projected image, etc.) using the projector display commands (405) and movements (i.e., operations) of an integrated laser pointer using the integrated laser pointer commands (407).

FIG. 4B shows another view of the UI (401) where only the projection material (403) is displayed and visible to the user. The projector display commands (405) and the integrated laser pointer commands (407) are embedded within the file of the projection material (403) and not directly visible to the user. The projector display commands (405) and the integrated laser pointer commands (407) may be embedded during the creation of the projection material (403).

In one or more embodiments, the user of the UI (401) may control the system (100) discussed above in FIG. 1, using a combination of the projector display commands (405) and the integrated laser pointer commands (407) shown in FIGS. 4A and 4B, to execute the following sequence of actions:

1. Display the projected image to start a presentation. The integrated laser pointer is off when presentation is started.
2. Upon receipt of a command to advance (herein referred to as "an advancement command"), the integrated laser pointer is turned on and draws a circle around a word in the presentation.
3. Upon receipt of another advancement command, the integrated laser pointer displays an arrow pointing at a different (or the same) word in the presentation.
4. Upon receipt of another advancement command, the integrated laser pointer is turned off because the integrated laser pointer is not needed at this time of the presentation.

5. Upon receipt of a turn-on command and a manual control command, the integrated laser pointer is turned on and the user is given manual control of the integrated laser pointer using a peripheral device.
6. Upon receipt of a turn-off command and an automatic control command, the integrated laser pointer is turned off and switched back to automatic control by the system (100).
7. Stop the display of the projected image to end the presentation.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that include at least the minimum processing power, memory, and input and output device(s) to perform one or more embodiments of the invention. For example, as shown in FIG. 4, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the invention.

Further, one or more elements of the aforementioned computing system (500) may be located at a remote location and be connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One or more embodiments of the invention may have one or more of the following advantages: the ability to precisely control a laser pointer by eliminating user-caused errors such as hand tremors, imperfections in shapes and figures drawn by hand, and potential harm to the audience by unintentionally pointing the laser pointer in an audience member's eye; the ability to simultaneously control the projection of an image along with a control of the integrated laser pointer; the ability to calibrate the integrated laser pointer to translate movement of the integrated laser pointer within a user interface (UI) to movement of the integrated laser pointer on a projected image; the ability to provide remote access to other users by sharing control of the integrated laser pointer or tracing and reproducing movements of a laser pointer on a display at a remote location; etc.

While the invention has been described with respect to a limited number of embodiments, those skilled in the art, having benefit of this disclosure, will appreciate that other embodiments can be devised without departing from the scope of the invention as disclosed herein. Accordingly, the scope of the invention should be limited only by the attached claims.

What is claimed is:

1. A method for controlling an integrated laser pointer of a projector, the method comprising:
   causing the integrated laser pointer to, in response to commands from a processor:
      switch the integrated laser pointer to an ON state and adjust a position of the integrated laser pointer to display a dot on a predetermined position of a projected image;
      switch between the ON state and an OFF state in synchronization with a change in a content of the projected image;
      switch between an automatic mode and a manual mode; and
      switch to the OFF state and stop displaying the dot.

2. The method of claim 1, further comprising:
   causing the integrated laser pointer to, in response to the commands from the processor:
      draw a predetermined shape around the content;
      execute a preset chain of commands based on the content; and
      adjust the position to display the dot on a surface outside of an area delimiting the projected image, wherein the predetermined shape drawn by the integrated laser pointer is a vector-graphic shape.

3. The method of claim 2, wherein
   the projected image is a presentation, and
   the preset chain of commands comprises one or more of:
      switching to the OFF state when a slide of the presentation is first displayed;
      switching to the ON state and displaying the dot on the predetermined location;
      drawing the predetermined shape around the content;
      drawing an arrow pointing to the content; and
      switching to the OFF state.

4. The method of claim 3, further comprising:
   causing the integrated laser pointer to, in response to the commands from the processor:

cancel, while executing the preset chain of commands and in response to a manual-control command among the commands from the processor, the preset chain of commands and switch to the manual mode; and switch, while in the manual mode and in response to an automatic-control command among the commands from the processor, to the automatic mode and resume the preset chain of commands.

5. The method of claim 1, wherein
the projected image is a presentation, and
the method further comprises causing the integrated laser pointer to, in response to the commands from the processor:
execute, in response an advance command among the commands from the projector, any one of:
switching to the ON state and displaying the dot;
drawing a predetermined shape around the content;
drawing an arrow pointing to the content;
highlighting a portion of the content by displaying the dot on the portion; and
switching to the OFF state and stop displaying the dot.

6. The method of claim 1 further comprising:
causing the integrated laser pointer to, in response to a remote-share command among the commands from the processor:
switch between a local-controlled mode and a remote-controlled mode, wherein
in the local-controlled mode, the integrated laser pointer is controlled by a first user within an area with physical access to the projector, and
in the remote-controlled mode, the integrated laser pointer is controlled by a second user within an area without the physical access to the projector.

7. The method of claim 6 further comprising:
receiving, by the processor and from the second user, trajectory information comprising movements of a remote laser pointer held by the second user at the area without the physical access to the projector;
causing, in response to receiving the trajectory information, the integrated laser pointer to adjust the position to execute the movements of the remote laser pointer on the projected image.

8. The method of claim 1, further comprising:
transforming, by the processor, a Cartesian coordinate system input to two-dimensional angular coordinate controls for the integrated laser pointer,
wherein the two-dimensional angular coordinates is the $\theta$, $\varphi$ of spherical coordinates.

9. The method of claim 1, further comprising:
transforming, by the processor, a Cartesian coordinate system input to planar circular coordinates (r, $\theta$) controls for the integrated laser pointer.

10. The method of claim 1, wherein
the projector is controlled by a computer coupled to the projector, and
the projected image and integrated laser pointer are simultaneously controlled through a single user-interface.

11. A non-transitory computer readable medium (CRM) storing computer readable program code for controlling an integrated laser pointer of a projector embodied therein, the computer readable program code causes the integrated laser pointer to:

switch the integrated laser pointer to an ON state and adjust a position of the integrated laser pointer to display a dot on a predetermined position of a projected image;
switch between the ON state and an OFF state in synchronization with a change in a content of the projected image;
switch between an automatic mode and a manual mode; and
switch to the OFF state and stop displaying the dot.

12. The CRM of claim 11, wherein the computer readable program code further causes the integrated laser pointer to:
draw a predetermined shape around the content;
execute a preset chain of commands based on the content; and
adjust the position to display the dot on a surface outside of an area delimiting the projected image,
wherein the predetermined shape drawn by the integrated laser pointer is a vector-graphic shape.

13. The CRM of claim 12, wherein
the projected image is a presentation, and
the preset chain of commands comprises one or more of:
switching to the OFF state when a slide of the presentation is first displayed;
switching to the ON state and displaying the dot on the predetermined location;
drawing the predetermined shape around the content;
drawing an arrow pointing to the content; and
switching to the OFF state.

14. The CRM of claim 13, wherein the computer readable program code further causes the integrated laser pointer to:
cancel, while executing the preset chain of commands and in response to a manual-control command, the preset chain of commands and switch to the manual mode; and
switch, while in the manual mode and in response to an automatic-control command, to the automatic mode and resume the preset chain of commands.

15. The CRM of claim 11, wherein
the projected image is a presentation, and
the computer readable program code further causes the integrated laser pointer to:
execute, in response an advance command from the projector, any one of:
switching to the ON state and displaying the dot;
drawing a predetermined shape around the content;
drawing an arrow pointing to the content;
highlighting a portion of the content by displaying the dot on the portion; and
switching to the OFF state and stop displaying the dot.

16. A system for controlling an integrated laser pointer of a projector, the system comprising:
the projector;
the integrated laser pointer; and
a processor coupled to a memory, wherein
the processor causes the integrated laser pointer to, in response to commands from the processor:
switch the integrated laser pointer to an ON state and adjust a position of the integrated laser pointer to display a dot on a predetermined position of a projected image;
switch between the ON state and an OFF state in synchronization with a change in a content of the projected image;
switch between an automatic mode and a manual mode; and switch to the OFF state and stop displaying the dot.

17. The system of claim 16, wherein the processor further causes the integrated laser pointer to, in response to the commands from the processor:
   draw a predetermined shape around the content;
   execute a preset chain of commands based on the content; and
   adjust the position to display the dot on a surface outside of an area delimiting the projected image,
   wherein the predetermined shape drawn by the integrated laser pointer is a vector-graphic shape.

18. The system of claim 17, wherein
   the projected image is a presentation, and
   the preset chain of commands comprises one or more of:
      switching to the OFF state when a slide of the presentation is first displayed;
      switching to the ON state and displaying the dot on the predetermined location;
      drawing the predetermined shape around the content;
      drawing an arrow pointing to the content; and
      switching to the OFF state.

19. The system of 18, wherein the processor further causes the integrated laser pointer to, in response to the commands from the processor:
   cancel, while executing the preset chain of commands and in response to a manual-control command among the commands from the processor, the preset chain of commands and switch to the manual mode; and
   switch, while in the manual mode and in response to an automatic-control command among the commands from the processor, to the automatic mode and resume the preset chain of commands.

20. The system of claim 16, wherein
   the projected image is a presentation, and
   the processor further causes the integrated laser pointer to, in response to the commands from the processor:
      execute, in response an advance command among the commands from the projector, any one of:
         switching to the ON state and displaying the dot;
         drawing a predetermined shape around the content;
         drawing an arrow pointing to the content;
         highlighting a portion of the content by displaying the dot on the portion; and
         switching to the OFF state and stop displaying the dot.

* * * * *